United States Patent [19]
Davies et al.

[11] 3,783,208
[45] Jan. 1, 1974

[54] METAL-ENCLOSED SWITCHGEAR WITH INTERLOCK MEANS

[75] Inventors: Norman Davies, Trafford; Robert E. Wobrak, Irwin, both of Pa.

[73] Assignee: Westinghouse Electric Corp., Pittsburgh, Pa.

[22] Filed: July 17, 1972

[21] Appl. No.: 272,702

[52] U.S. Cl.............. 200/50 AA, 200/153 SC
[51] Int. Cl......................... H01h 9/24, H01h 33/50
[58] Field of Search................ 200/50 AA, 153 SC

[56] References Cited
UNITED STATES PATENTS
2,129,723  9/1938  Wood.................... 200/50 AA UX
3,684,848  8/1972  Davies........................ 200/153 SC
3,295,025  12/1966  Tjebben..................... 200/50 AA X
3,569,652  3/1971  Hauser....................... 200/153 SC
3,343,042  9/1967  Cellerini et al............ 200/50 AA X
3,610,850  10/1971  Eichelberger................. 200/50 AA Primary Examiner—J. R. Scott
Attorney—A. T. Stratton et al.

[57] ABSTRACT

Metal-enclosed switchgear comprising improved safety interlock means for preventing withdrawal or insertion of a circuit interrupter, or charging of the overcenter spring means, under certain conditions.

9 Claims, 16 Drawing Figures

METAL-ENCLOSED SWITCHGEAR WITH INTERLOCK MEANS

CROSS-REFERENCE TO RELATED APPLICATIONS

Certain parts of the herein disclosed circuit breaker are disclosed in copending patent applications of Norman Davies, entitled "Circuit Interrupter," Ser. No. 106,328, filed Nov. 4, 1971 now U.S. Pat. No. 3,684,848, as well as Ser. No. 203,216, filed Nov. 30, 1971 now U.S. Pat. No. 3,735,073.

BACKGROUND OF THE INVENTION

1. Field of the Invention

This invention relates to metal-enclosed switchgear and more particularly to circuit interrupters which are removably mounted in a metal enclosure in which mechanical interlocking means are provided for safeguarding operating personnel.

2. Description of the Prior Art

Metal-enclosed switchgear comprises an enclosure and a circuit interrupter which is movable into and out of the enclosure. Ordinarily the enclosure and the circuit interrupter are provided with corresponding terminals or contacts whereby such corresponding terminals or contacts of the enclosure and the interrupter are connected or disconnected when the circuit interrupter is moved into or out of the enclosure. In order to safeguard operating personnel it is desirable to provide interlock means for varying circumstances. Most of the metal-enclosed switchgear of prior construction have included interlock mechanisms for specific purposes only without providing complete safeguard means for the personnel.

SUMMARY OF THE INVENTION

It has been found in accordance with this invention that the foregoing disadvantages may be overcome by providing a metal-enclosed switchgear having adequate interlocking means and comprising an enclosure and a circuit interrupter removably mounted in the enclosure, the enclosure comprising a rear wall, a bottom wall, and a front opening, the rear wall having enclosure terminal means supported thereon, the bottom wall having a trip rail with inclined end portions and extending substantially parallel to the direction of insertion and removal of the interrupter from the enclosure, the interrupter having interrupter terminal means for cooperating connection with the enclosure terminal means, the circuit interrupter also having a rotatable levering-in shaft for moving said terminals into and out of contact and an elongated keyway in the shaft; the interrupter having a stationary contact structure and a movable contact structure electrically connected to corresponding terminal means, the movable contact structure being movable between open and closed circuit positions with respect to the stationary contact structure, the interrupter having drive means including a rotatable operating shaft operatively connected to the movable contact structure, linkage means extending between the operating shaft and the levering-in shaft and comprising a key and a rod operative to move the key into the keyway when the operating shaft is rotated, the drive means also comprising an overcenter spring structure operatively connected to the operating shaft, a spring-charging element rotatably mounted on the shaft and operable between first and second positions to move the overcenter spring structure from the spring-discharged position to the spring-charged position, and key means operatively connected with the spring-charging element for locking and unlocking the shaft when the spring-charging element is rotated respectively between the spring-charged and spring-discharged positions, a panel coextensive with the front opening of the enclosure and provided with an access aperture adjacent to the spring-charging element, a shutter movable between access-blocking and unblocking positions with respect to the spring-charging element, the shutter being pivotally mounted on the panel for movement between said positions, and a leverage mechanism extending between the shutter and the trip rail and including a lever operative to maintain the shutter in the blocking position when the lever is on the trip rail and in the unblocking position when the lever is off of the trip rail.

The advantage of the device of this invention is that it satisfies basic interlock requirements of a circuit interrupter of the drawout type which is operative within a metal enclosure which requirements include (1) inability to insert or withdraw the interrupter when the contacts are in the closed position, (2) inability to withdraw or insert the interrupter when the operating spring is charged, and (3) inability to charge the operating spring except when the interrupter is completely inserted or withdrawn. Thus, operating personnel are provided with overall safeguard for preventing accidents due to their own inadvertence.

DESCRIPTION OF THE PREFERRED EMBODIMENT

Figure 1:
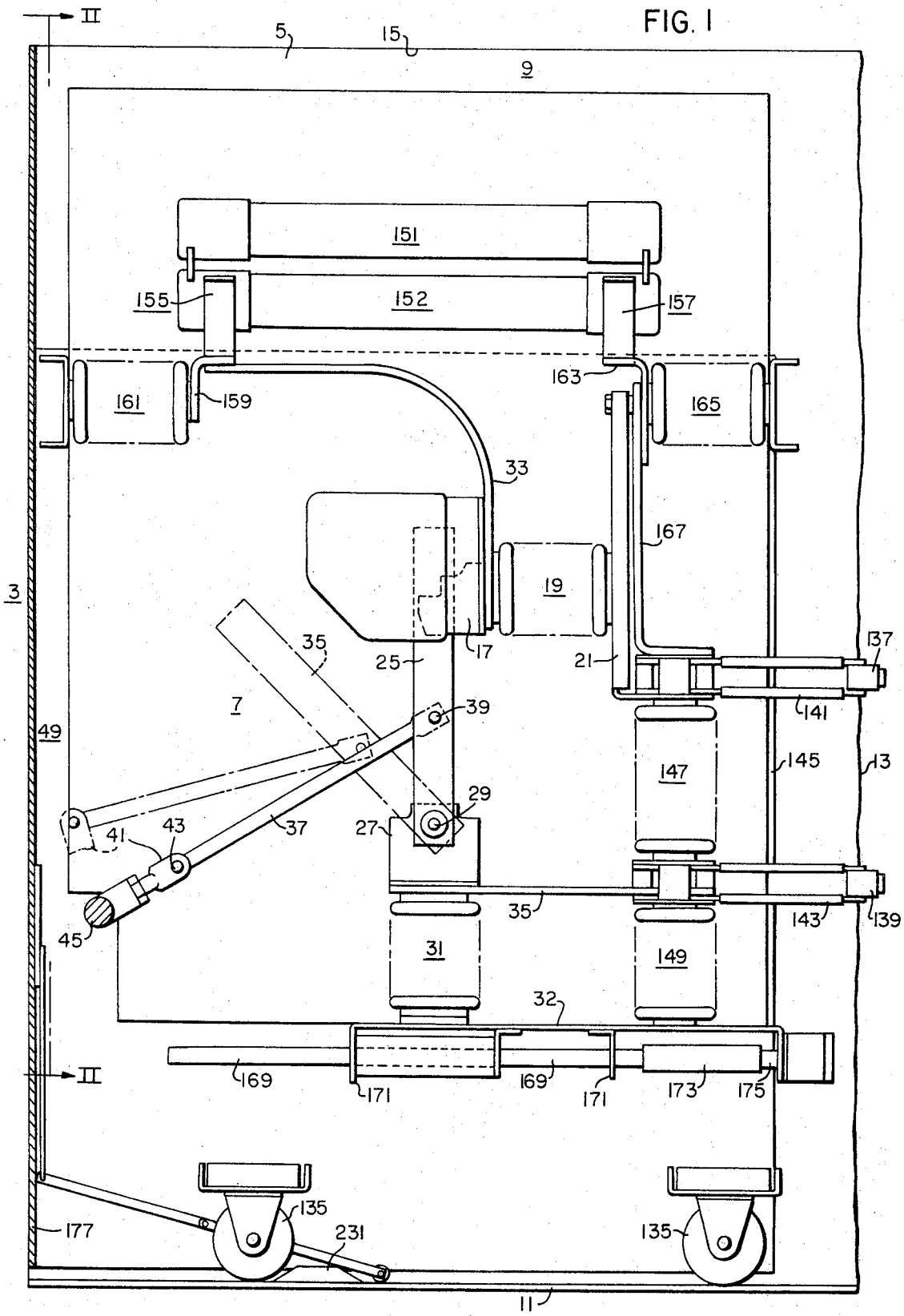
FIG. 1 is a side elevational view, with parts broken away, of metal-enclosed switchgear constructed in accordance with the principles of this invention.

In FIG. 1 of the drawing, a metal-enclosed switchgear is generally indicated at 3 and it comprises an enclosoure 5 and a draw-out type circuit interrupter 7. The enclosure 5 comprises sheet metal side walls and supports formed to provide a cubicle 9 having a bottom wall 11, a rear wall 13, and a front opening 15.

The circuit interrupter 7 comprises three stationary contacts 17 (FIG. 1) supported on three spaced insulating members 19 that are supported on a back support member 21. A separate movable contact arm 25 is provided to cooperate with each of the stationary contacts 17. Each of the contact arms 25 comprises a pair of spaced contact members (FIG. 2) that engage the associated stationary contact 17 in the closed position of the contacts. Each of the contact arms 25 is supported for pivotal movement on a separate conducting terminal 27 by means of a pivot pin 29. Each of the terminals 27 is supported on an insulating support 31 that is, in turn, supported on a support member 32. In each pole unit, a terminal plate 33 is connected to the contact 17 and a terminal plate 35 is connected to the terminal 27 to enable connection of the pole unit in an electric circuit.

Figure 2:
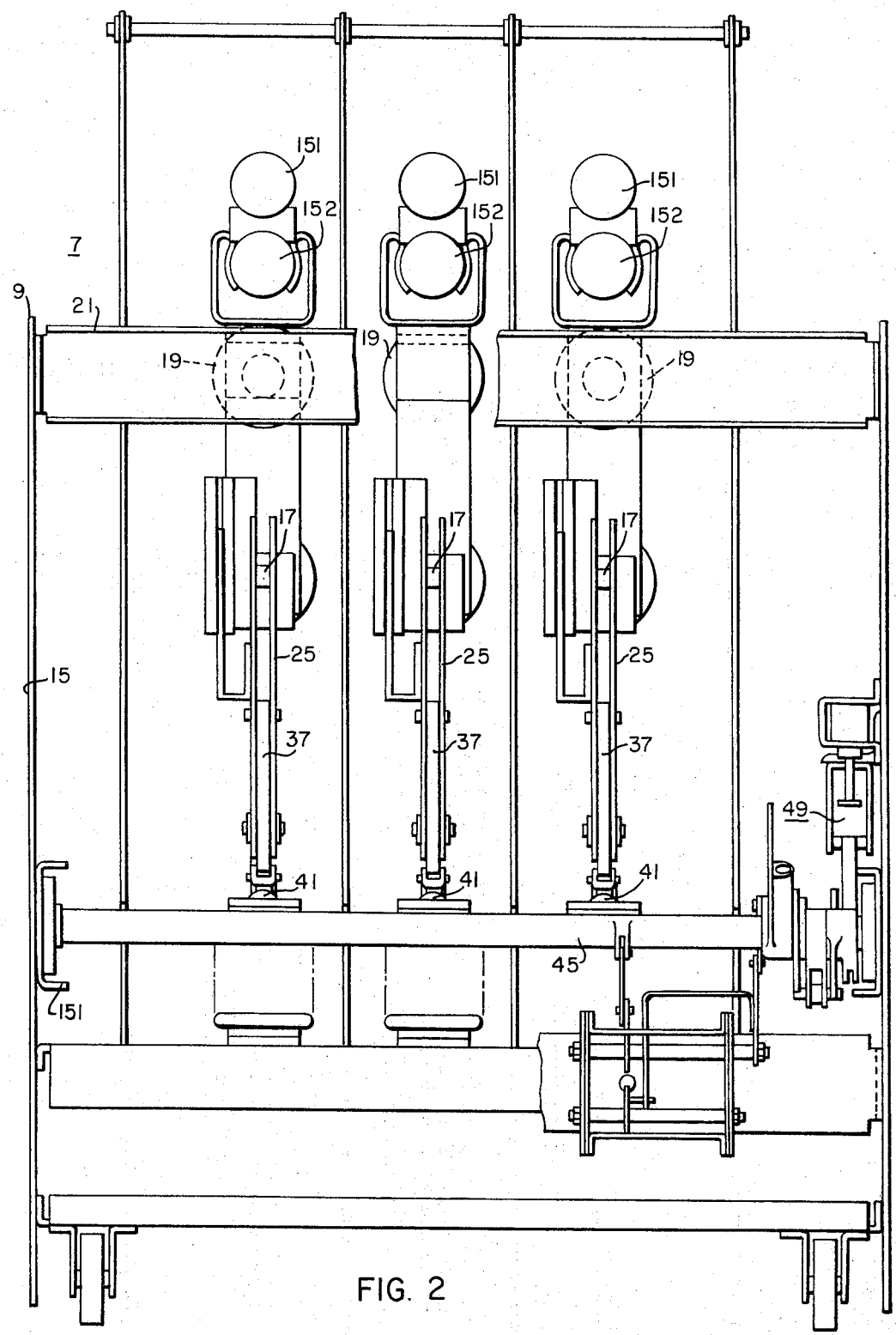
FIG. 2 is a front view of the circuit interrupter taken on line II—II of FIG. 1.

In each pole unit, an elongated link 37 (FIG. 1) is pivotally connected at one end thereof to the movable contact arm 25 by means of a pivot pin 39 and at the other end thereof to a member 41 by means of a pivot pin 43. Each of the members 41 is an integral part of an elongated operating shaft 45. As shown in FIG. 1 and 2, the operating shaft 45 is supported on the side plate means 15 for rotational movement about the elongated axis thereof. The circuit interrupter is shown in full lines in FIG. 2 in the closed position. Upon counterclockwise movement of the operating shaft 45 to the open position shown in broken lines, the three links 37 of the three pole units are moved to move the contact arms 25 to the open positions shown in broken lines. Reverse or clockwise movement of the operating shaft 45 from the position shown in broken lines operates through the links 37 to move the three contact arms 25 from the open positions shown in broken lines to the closed positions shown in full lines.

An operating mechanism 49 (FIGS. 1, 2 and 3) is provided for operating the operating shaft 45 between the closed and open positions. The operating mechanism 49 comprises drive means 51, an overcenter spring structure 53, (FIG. 4) a latch linkage 55, a latch structure 57, and a trip device 59.

The drive means 51 comprises a drive member 61 supported on the operating shaft 45 for rotational movement relative to the operating shaft 45. The drive member 61 is provided with an opening 63 for receiving a crank rod 65 that can be placed into the opening 63 in order to crank the drive member 61 between the open and closed positions.

The overcenter spring structure 53 comprises an elongated rod 67 that extends at one end thereof through an opening 69 in a stationary plate 71 that is connected on the side plate means 15. A pin 73 and a washer 75 are supported on the rod 67. An overcenter spring 77 is supported on the rod 67 between the washer 75 and the plate 71. The rod 67 is pivotally connected at the other end thereof to a member 79 by means of a pin 81. The pin 81 (FIG. 3) extends out through opposite sides of the member 79 which is supported on the operating shaft 45 for rotational movement relative to the operating shaft 45. A member 85 is fixedly secured to the operating shaft 45 and is provided with an extension 87 at one side of the operating shaft and an extension 89 at the other side of the operating shaft 45.

The member 85 (FIG. 7) is also provided with an integral extension or toggle link 91 tha serves as one link of a toggle of the latch linkage 55 in a manner to be hereinafter described. The other toggle link is a member 93 that is pivotally connected at one end thereof to the part 91 by means of a pivot pin 95 and at the other end thereof to an elongated link 97 by means of a pivot pin 99. The link 97 is pivotally supported, intermediate the ends thereof, on a stationary support bracket 101 by means of a pin 103. The support bracket 101 is suitably secured to the side plate means 15. The link 97 is provided with a notch 105 at the upper end thereof that engages a roller 107 of a roller latch 109. The roller latch 109 is pivotally supported on the bracket 101 by means of a pin 111. The roller latch 109 is provided with a roller 113 at the other end thereof that engages in a notch 115 of a latch member 117 that is pivotally supported on the bracket 101 by means of a pivot pin 110. A torsion spring 121 biases the roller latch 109 in a clockwise direction to the latching position seen in FIG. 4, and a torsion spring 123 biases the latch 117 in a counterclockwise direction to the latching position seen in FIG. 4. The latch 117 is provided with an extension 127 that can be manually moved to pivot the latch 117 in a clockwise direction in order to operate the interrupter in a manner to be hereinafter described. The extension 127 may also be actuated by the electromagnetic trip 59 that comprises a plunger 129 that is raised when the electromagnet 59 is energized to thereby automatically move the latch 117 in a clockwise (FIG. 4) direction to the actuated position.

Figure 3:
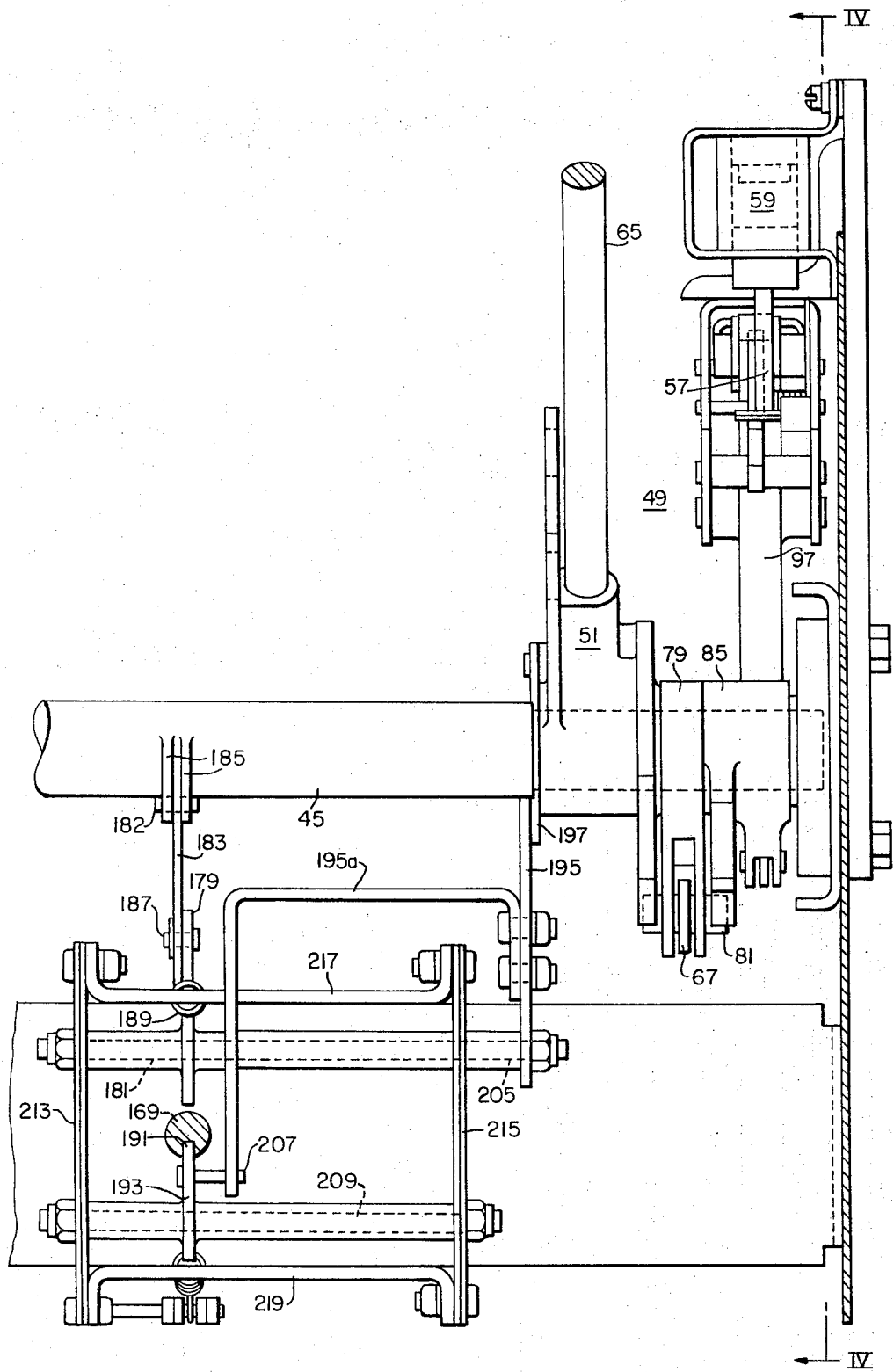
FIG. 3 is a front sectional view, with parts broken away illustrating the operating mechanism shown in FIG. 2.
Figure 4:
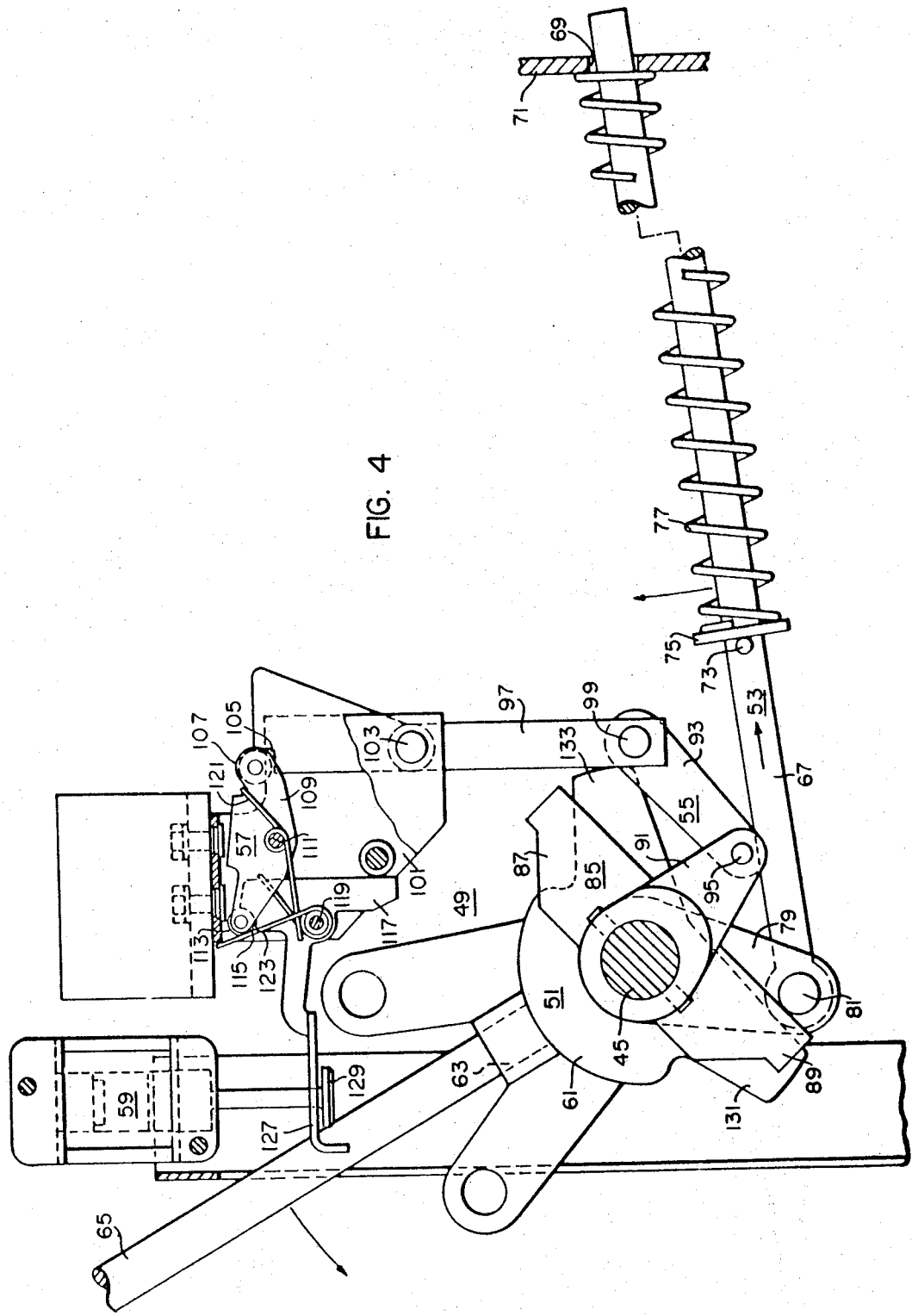
FIG. 4 is a sectional view, taken along the line IV—IV of FIG. 3, with parts being shown in the spring-discharged closed position.
Figure 5:
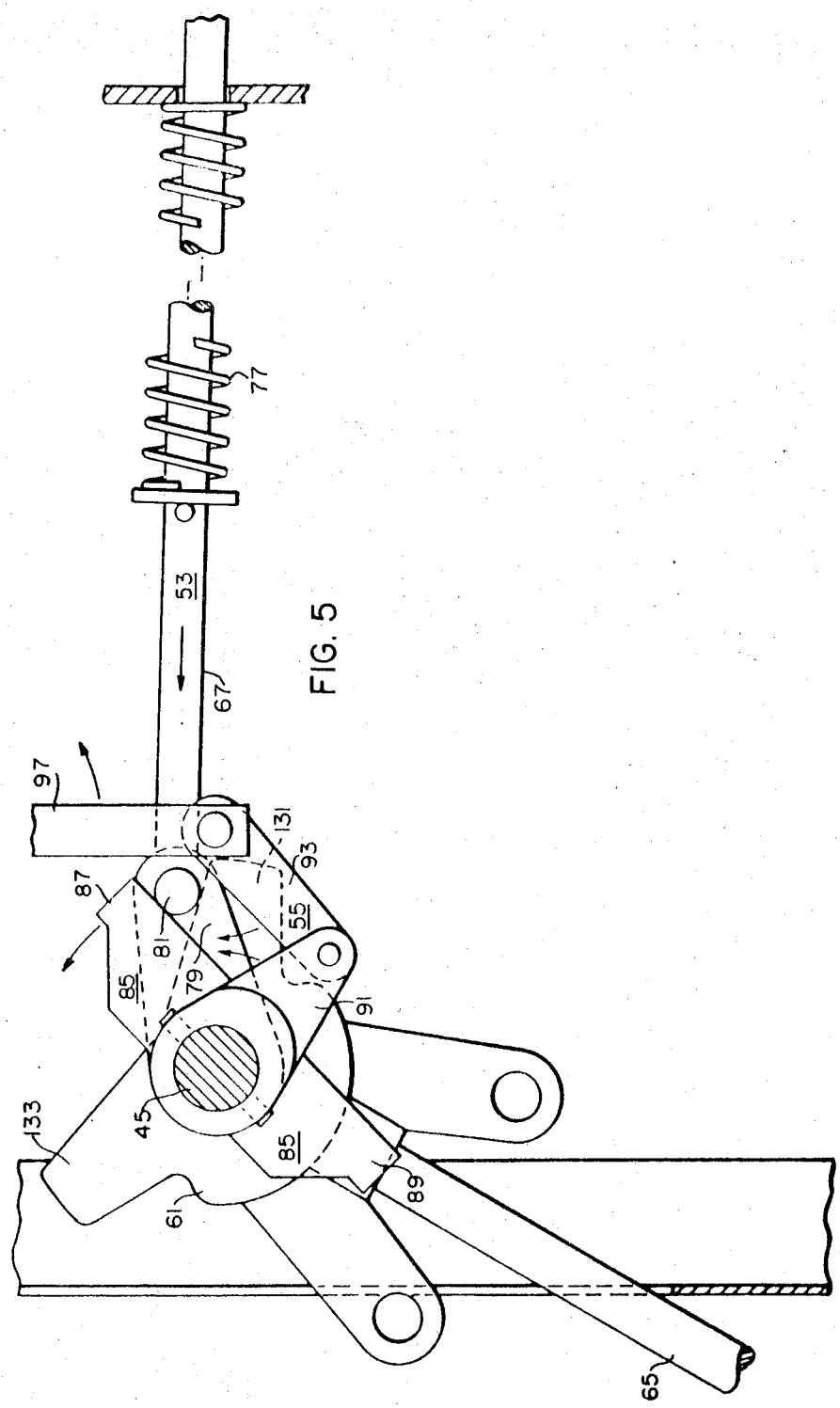
FIG. 5 is a view of certain parts disclosed in FIG. 4 with the parts being shown in the spring-charged closed position.

The circuit interrupter is shown in the spring-charged closed position in FIGS. 1 and 5 and in the spring-discharged closed position in FIG. 4. In order to operate the circuit interrupter to the open position, the crank rod 65 is placed in the opening 63 (FIG. 4) of the drive member 61, and the crank rod 65 is manually cranked from the spring-discharged closed position seen in FIG. 4 to the spring-charged closed position seen in FIG. 5. During this movement, an extended part 131 of the drive member 61 engages the pin 81 (FIGS. 3 and 4) to drive the intermediate member 79 and spring rod 67 from the spring-discharged closed position seen in FIG. 4 to the overcenter spring-charged closed position seen in FIG. 5. During this movement, the spring 77 is charged and near the end of this movement, the spring rod 67 passes overcenter relative to the axis of the operating shaft 45 whereupon the spring 77 starts to discharge driving the pin 81 agains the extended part 87 of the member 85 to bias the member 85 and the operating shaft 45, to which the member 85 is secured, in a counterclockwise (FIG. 5) direction toward the open position seen in FIG. 7. The overcenter spring structure 53 is latched in this spring-charged closed position (FIG. 5) by the latch linkage 55 (FIG. 4) which prevents counterclockwise rotation of the operating shaft 45 and by the latch structure 57 which latches the latch linkage 55 in the position seen in FIG. 4. In this position, it is noted that a toggle 91, 93 of the latch linkage 55 is underset or collapsed in a downward (FIGS. 4 and 5) direction. The parts will remain in the spring-charged closed position seen in FIG. 5 until release of the latch linkage 55. Thus, energy is stored for a closing operation.

In order to close the circuit interrupter with the spring 77 in the charged position seen in FIG. 5, the latch member 117 (FIG. 4) is pivoted in a clockwise direction manually, by lifting the part 127, or electromagnetically by operation of the electromagnet 59 to move the plunger 129 upward to lift the part 127. During this movement, the latch 117 moves to release the roller 113 from the notch 115 permitting the roller latch 109 to rotate in a counterclockwise (FIG. 4) direction about the pin 111. This movement permits the roller 107 to move out of the notch 105 permitting the elongated link 97 to pivot in a counterclockwise direction about the pivot pin 103. This movement releases the toggle 91, 93 to release the operating shaft 45 whereupon the charged spring 77 discharges driving the rod 67 from the spring-charged closed position seen in FIG. 5 to the spring-discharged open position seen in FIG. 6 with the pin 81 (FIGS. 3, 5 and 6) operating against the extended part 87 of the member 85 to drive the member 85, and the operating shaft 45 to which the member 85 is secured, in a counterclockwise direction from the spring-charged closed position seen in FIG. 5 to the spring-discharged open position seen in FIG. 6. During this movement, the operating shaft 45 rotates from the closed position seen in full lines in FIG. 1 to the open position seen in broken lines in FIG. 1 moving the links 37 of the three pole units to the position seen in broken lines in FIG. 1 to thereby move the three contact arms 25 to the open positions seen in broken lines in FIG. 1. Upon movement of the parts from the spring-charged closed position seen in FIG. 5 to the spring-discharged open position seen in FIG. 6, the toggle 91, 93 is moved from the collapsed or downward underset position seen in FIG. 5 to the collapsed or upward underset position seen in FIG. 6 during which movement the link 97 is moved first in a counterclockwise direction as the toggle 91, 93 moves to the erected position and then in a clockwise direction as the toggle 91, 93 collapses to the upward underset position seen in FIG. 6. This movement automatically resets the toggle link 97 in the position seen in FIG. 6, and the springs 121, 123 automatically reset the latches 109, 117 respectively in the latching position seen in FIG. 6.

Figure 6:
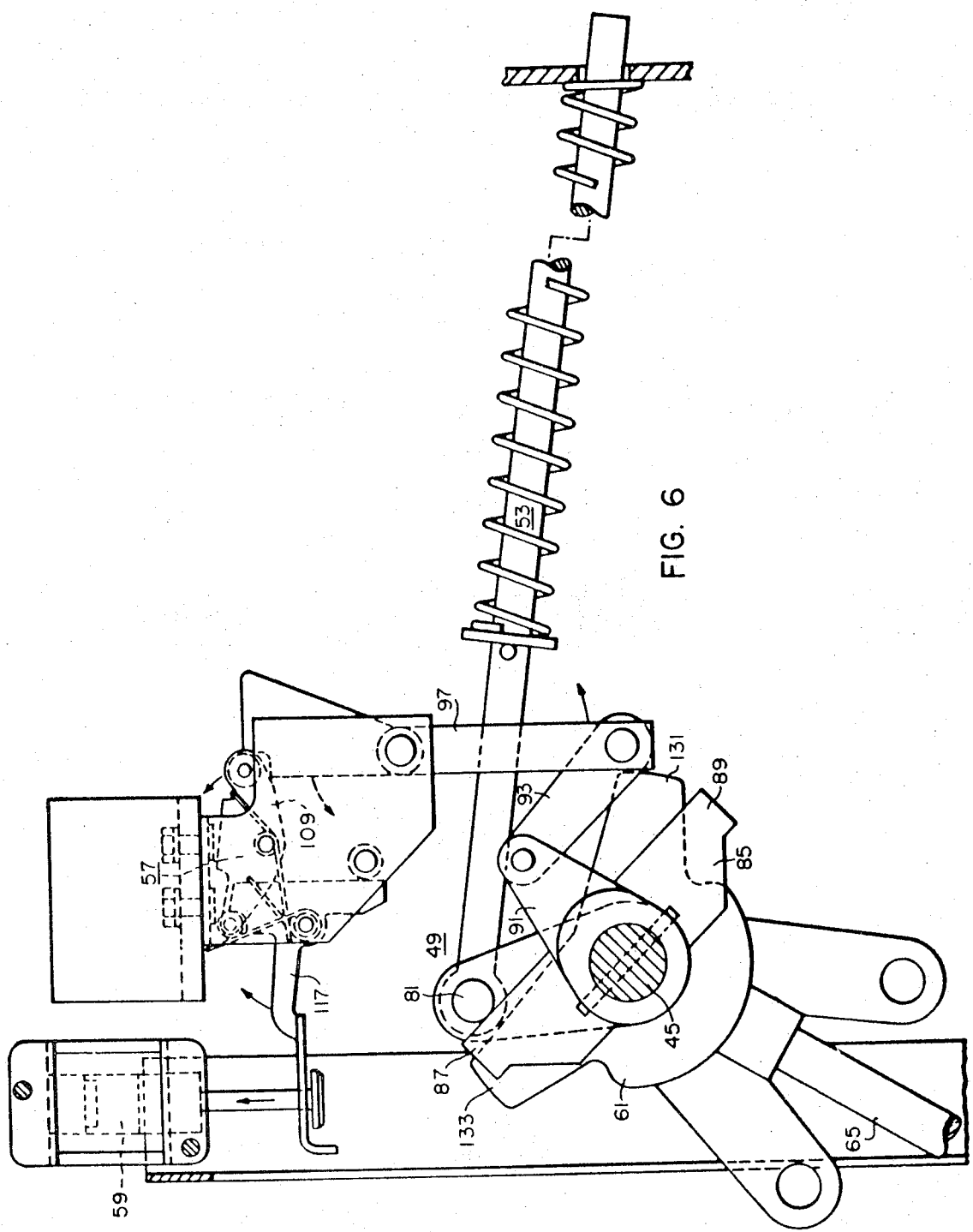
FIG. 6 is a view similar to FIG. 4 with the parts being shown in the spring-discharged open position.
Figure 7:
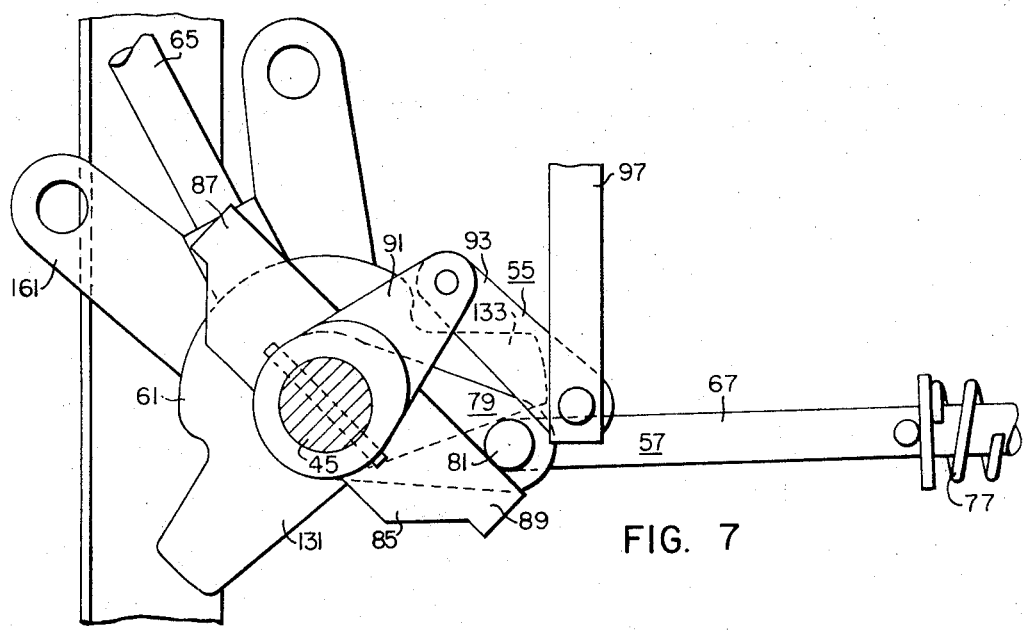
FIG. 7 is a view similar to FIG. 6 with the parts being shown in the spring-charged open position.

In order to manually operate or actuate the circuit interrupter from the spring-discharged open position seen in FIG. 6 to the spring-discharged closed position seen in FIG. 4, the circuit interrupter is first operated to the spring-charged open position seen in FIG. 7. With the circuit interrupter in the position seen in FIG. 6, the crank 65 is moved from the position seen in FIG. 6 to the position seen in FIG. 7. During this movement, the drive member 61 is moved with the projecting portion 133 thereof operating against the pin 81 (FIGS. 6 and 3) to drive the member 79 and the rod 67 from the spring-discharged open position seen in FIG. 6 to the spring-charged open position seen in FIG. 7. During this movement, the rod 67 goes overcenter relative to the axis of the operating shaft 45 and the spring 77, which is charged during the early part of this movement, starts to discharge forcing the rod 67 and member 79 in a counterclockwise (FIG. 7) direction. This movement is limited by the engagement of the pin 81 with the projecting part 89 of the member 85, that is secured to the operating shaft 45, and with the latch linkage 55 latched by means of the latch structure 57, the parts are latched in the stored-energy spring-charged open position seen in FIG. 7.

In order to release the stored energy and close the circuit breaker, the part 127 of the latch member 117 is lifted, either manually or electromagnetically, to rotate the latch 117 in a counterclockwise direction to release the roller 113 from the notch 115 to release the roller latch member 109 permitting counterclockwise movement of the roller latch member 109. Upon release of the roller latch member 109 the roller 107 moves out of the notch 105 of the link 97 to permit counterclockwise movement of the link 97. This movement permits the toggle 91, 93 to move from the upward underset position seen in FIG. 6 to thereby permit clockwise movement of the operating shaft 45. The spring 77 discharges moving the rod 67 from the spring-charged open position seen in FIG. 7 to the spring-discharged closed position seen in FIG. 4. During this movement the pin 81, operating against the part 89 of the member 85, drives the member 85 and operating shaft 45 from the spring-charged open position seen in FIG. 7 to the spring-discharged closed position seen in FIG. 4. During this movement, the operating shaft 45 rotates in a clockwise (FIG. 1) direction to move the links 37 and the three contact arms 25 from the open positions seen in broken lines in FIG. 1 to the closed positions seen in full lines in FIG. 1. During this movement to the closed position, the movement of the operating shaft 45, operating through the toggle 91, 93 first moves the link 97 in a counterclockwise direction as the toggle 91, 93 moves to the erected position and then the link 97 is moved in a clockwise direction as the toggle 91, 93 moves to the downward underset position seen in FIG. 4. This movement moves the link 97 to the latching position seen in FIG. 4, and the springs 121, 123 operate to automatically reset the roller latch member 109 and latch member 117 in the latched position seen in FIG. 4. The circuit interrupter may then be operated to the spring-charged closed position seen in FIG. 5 and to the spring-discharged open position seen in FIG. 6 in the same manner as was hereinbefore described.

The latch linkage 55, the latch structure 57, and the trip device 59 are employed to retain the circuit interrupter in the spring-charged open position (FIG. 7) as well as in the spring-charged closed position (FIG. 5), and to release or trip the interrupter to the spring-discharged (open or closed) positions. However, it is noted that the circuit interrupter may be used without the latch linkage, the latch structure, and the trip device, in which case the circuit interrupter immediately moves from the spring-charged to the spring-discharged positions as the pivot pin 81 passes through the location of alignment of the axis of the rod 67 and the shaft 45. The circuit interrupter 7 thus far described is entirely set forth in the above-mentioned application, Ser. No. 106,328.

The circuit interrupter 7 is the drawout type for which purpose it is provided with a pair of wheels 135 (FIG. 1) supported at each of the two opposite sides thereof which wheels roll over the bottom wall 11 of the enclosure 5. The enclosure is also provided with enclosure terminal or disconnecting contact means, such as terminals 137 and 139, which are mounted in the rear wall 13. Corresponding interrupter terminal or disconnecting contact means including terminals 141 and 143 are mounted on a rear wall 145 of the interrupter and in alignment with the enclosure terminals 137 and 139 so that upon movement of the interrupter 7 to the right or left as viewed in FIG. 1 engagement or disengagement of the terminals or disconnecting contacts 137-143 is accomplished. The interrupter terminals 141 and 143 are mounted on insulating supports 147 and 149.

As shown in FIG. 1, the circuit interrupter 7 is also provided with fuse means, such as fuses 151 and 152, the ends of which are suitably mounted on clamp brackets 155 and 157. As shown, the bracket 155 is mounted on a support 159 which in turn is mounted on an insulating support 161, the terminal plate 33 is connected to the support 159. Likewise, the clamp bracket 157 is mounted on support 163 on an insulating support 165 and an electrically conducting member 167 extends between the interrupter terminal 141 and the support 163. Accordingly, the electric circuit through the switchgear 3 follows a path from the enclosure terminal 137 through the interrupter terminal 141, the member 167, the conducting support 163, the fuses 151 and 152, the terminal plate 33, the stationary contact 17, the movable arm 25, the conducting terminal 27, the terminal plate 35, the interrupter terminal 143, and the enclosure terminal 139. One or more fuses 151 and 152 may be used depending upon the current rating of the device.

In accordance with this invention, in order to provide more adequate safety protection to operating personnel, the circuit interrupter 7 is provided with an interlocking system as shown more particularly in FIGS. 8-16. The system comprises three interlocking structures that provide cooperating safety means responsive to varying conditions of the circuit interrupter 7.

As shown in FIG. 1, the interrupter 7 is provided with means for moving the interrupter to the right or left and for retaining the interrupter in the proper position for engagement of the terminals 137-143. That means includes a rod 169 which is rotatably mounted in frame brackets 171. The left end of the rod, as viewed in FIG. 1, is adapted for engagement with a suitable device such as a manual crank for rotating the rod. The right end of the rod 169 is provided with a sleeve 173 having internal threads for engagement with a threaded stud 175 which is attached to the enclosure 5. Thus, rotation of the rod 169 in one direction causes the interrupter 7 to be moved into the cubicle 9, whereby a front panel 177 of the interrupter is in substantial alignment with the front face of the enclosure 5. Conversely, rotation of the rod 169 in the opposite direction moves the interrupter 7 to the left whereby the terminals 137-143 are disengaged.

To prevent engagement or disengagement of the terminals 137-143 when the circuit interrupter 7 is in the closed position with the movable arm 25 upright and in engagement with the stationary contact 17, an interlock means is provided which functions with the rod or shaft 169. As shown in FIGS. 9 and 10, an interlock includes a lever 179 which is pivotally mounted at 181, and a link 183 as shown in FIG. 3 is pivotally mounted on a pin 182 on bracket means 185 on the operating shaft 45. The other end of the link 183 (FIGS. 8 and 9) is provided with an elongated slot 185 in which a pin 187 on the lever 179 is mounted. A coil spring 189 holds the lever 179 in the counterclockwise direction about the pivot 181. When the circuit interrupter 7 is in the contact closed position with the member 79 in the position shown more particulary in FIG. 4, the slot 185 in the link 183 is so disposed that the pin 187 is uninfluenced by the link, whereby the spring 189 rotates the lever 179 counterclockwise. As a result, the lower end of the lever 179 is seated in a keyway 191 which extends longitudinally of the rod 169 thereby preventing rotation of the rod for engaging or disengaging the terminals 137-143 in the manner described above. On the other hand, when the contacts are in the opened position, the lever 179 is in the position shown in FIG. 7, whereby the lever 179 is moved to the right as viewed in FIG. 10, whereby the link 183 engages the pin 187 at the end of the slot 185 and rotates the lever 179 against the spring 189, thereby lifting the lower end of the lever out of the keyway 191. Thus, the rod 169 is free to be rotated with the contacts in the open position.

Another interlock is provided for preventing insertion or withdrawal of the circuit interrupter 7 when the operating spring 77 is charged. As shown more particularly in FIGS. 11 and 12, the interlock cooperates with the rod 169 and includes a lever assembly comprising a lever 193, a lever 195, and a link 197. It also includes a bracket 199 that is mounted (FIG. 3) on the drive means 51. One end of the link 197 is pivotally attached by a pin 201 to the bracket 199. The other end of the link 197 is pivotally attached by a pin 203 to the upper end of the lever 195.

The lever 195 is pivotally mounted on a pin 205 and the lower end of the lever is movable counterclockwise against a pin 207 on the lever 193, the latter of which is pivotally mounted on a pin 209 and is biased counterclockwise by a coil spring 211. When the spring 77 is in the charged position as shown in FIGS. 5 and 7, the lever 195 is in the position shown in FIG. 11 so that the upper end of the lever 193 is spring biased against the rod 169 and upon rotation of the rod in an attempt to insert or withdraw the circuit interrupter 7 into the closure, the upper end of the lever 193 moves into the keyway 191 thereby preventing further rotation of the rod. However, when the spring 77 is in the discharged position as shown in FIGS. 4 and 6, the lever 195 is in the position shown in FIG. 12, whereby the lower end is in contact with the pin 207 to prevent the lever 193 from being spring biased against the rod 169. Accordingly in the spring-discharged position of the circuit interrupter 7, the rod 169 is free to rotate to permit insertion into or withdrawal of the circuit interrupter 7 from the enclosure 5.

Figure 11:
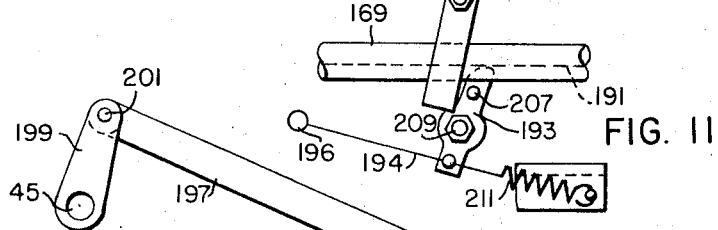
FIG. 11 is a diagrammatic view of the interlock engaging the levering-in shaft when the operating spring is charged.
Figure 12:
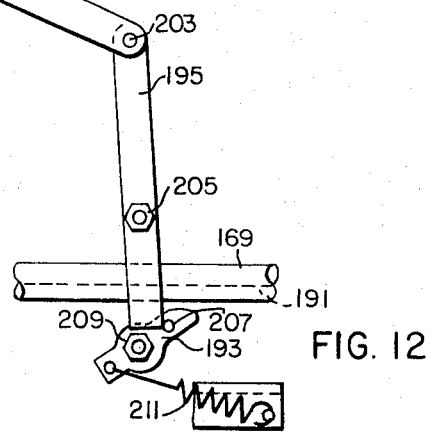
FIG. 12 is a diagrammatic view of the interlock engaged with the levering-in shaft when the operating spring is in the discharged position.

In the event of an emergency when the interrupter 7 is in the interlocked condition as shown in FIG. 11 with the spring 77 charged and the contacts open, it is sometime desirable to withdraw the interrupter without tripping the contacts. For that reason an additional feature is provided to defeat the key lever 193. It comprises an elongated member such as a wire 194 connected to the lever 193 below the pin 209. Suitable means such as a ring 196 is secured to the other (left) end of the wire 194, whereby the lever 193 may be rotated counterclockwise until it is removed from the keyway 191. The rod 169 can then be turned to withdraw the interrupter 7 from the enclosure. The ring 196 is preferably accessible only by the removal of a suitable cover plate which is removed only for emergency reasons.

Figure 8:
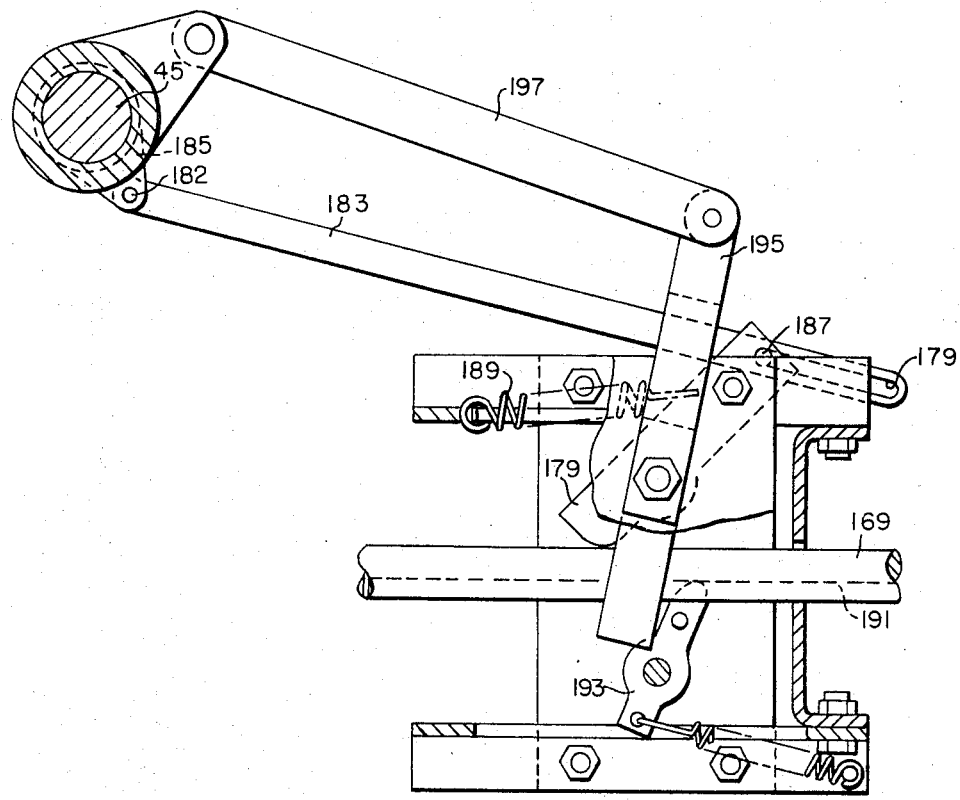
FIG. 8 is a fragmentary elevational view of a portion of the interlocking mechanism.
Figure 9:
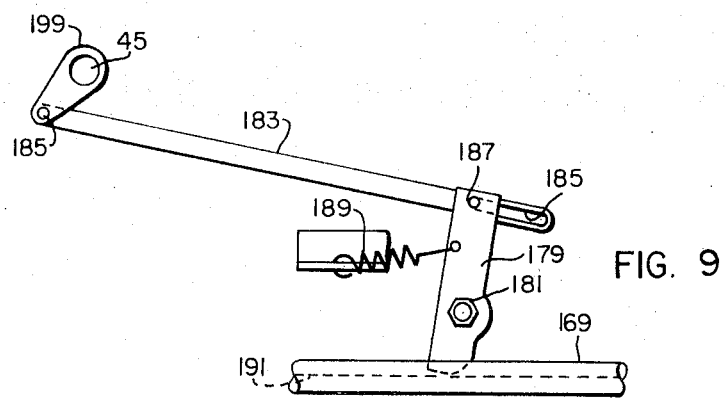
FIG. 9 is a diagrammatic view of the interlock engaging the levering-in shaft when the switch is in the closed position.
Figure 10:
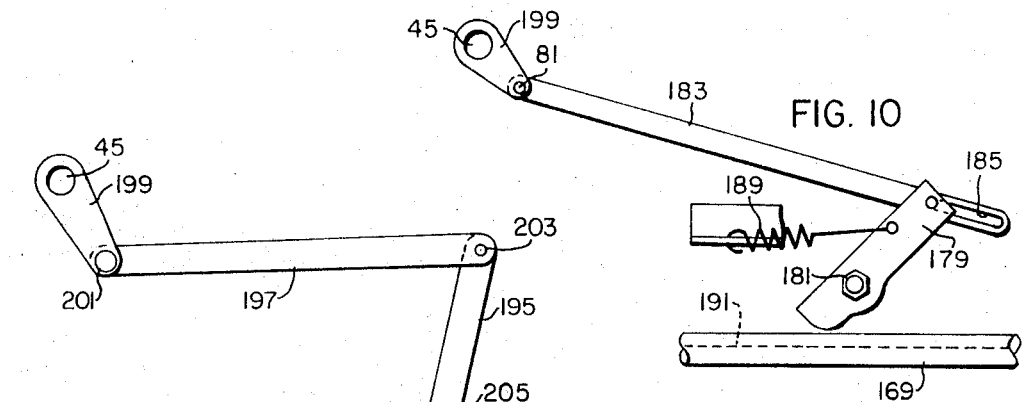
FIG. 10 is a diagrammatic view of the interlock engaged from the levering-in shaft when the switch is in the opened position.

The manner in which the interlocking devices shown in FIGS. 9 and 11 are mounted is shown more particularly in FIGS. 3 and 8 whereby spaced frame members 213 and 215 are disposed between channel members 217 and 219 which members 213–219 are suitably mounted in the circuit interrupter 7 in a manner not shown in the drawings. Likewise, suitable anchor locations for the ends of the spring 189 and 211 are provided. More particularly, inasmuch as the interlock device shown in FIG. 11 and comprising the lever 195 is offset from the interlock shown in FIG. 9, the lever 195 includes a U-shaped extension 195A (FIG. 3) the lower end of which comprises an extension of the lever 195 and functions with the pin 207.

The circuit interrupter 7 is also provided with an interlock for preventing charging of the spring 77 when the interrupter is in an intermediate position of insertion or withdrawal. In other words, interlock means are provided for permitting charging of the spring 77 only when the interrupter is in the completely connected or completely withdrawn operating positions or stages. The interlock means comprises (FIGS. 13–16) a lever 221, a link 223, a turning lever 225, a link 227, and a shutter 229. A trip rail 231 is provided on the bottom wall 11 (FIG. 1) for engaging a pin 233 on the lower end of the lever 221 which is pivotally mounted at point 235. The other end of the lever 221 is pivotally attached at 237 to the lower end of the link 223. The upper end of the link 223 is pivotally attached at 239 to the lever 225 which in turn is pivotally mounted at 241.

Figure 13:
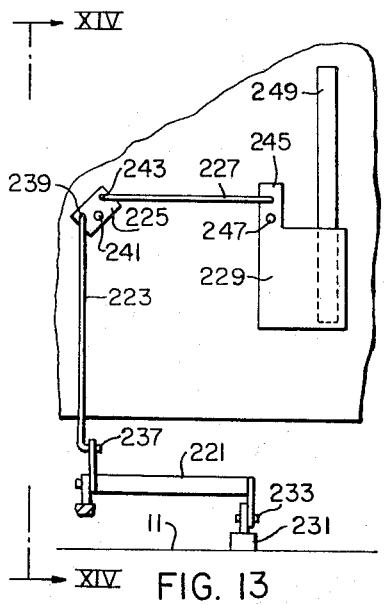
FIG. 13 is a diagrammatic view of the interlock positioned to prevent charging of the operating spring when the interrupter is incompletely connected.
Figure 14:
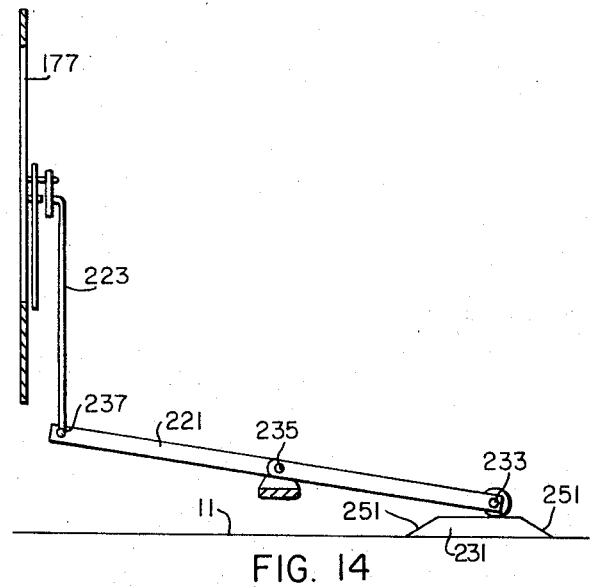
FIG. 14 is a view taken on the line XIV—XIV of FIG. 13.
Figure 15:
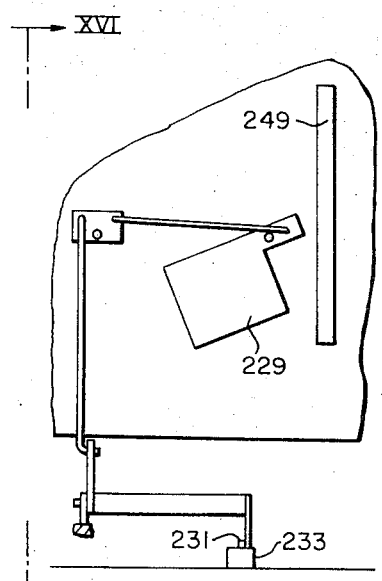
FIG. 15 is a diagrammatic view showing the position of the interlock for enabling charging of the operating spring when the interrupter is completely connected.
Figure 16:
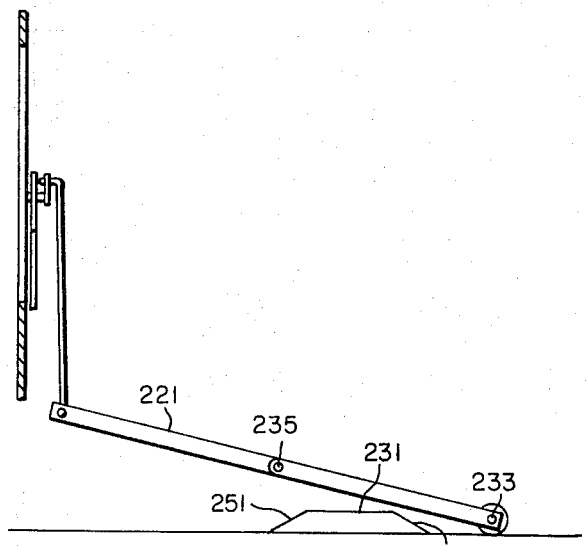
FIG. 16 is a diagrammatic view taken on the line XVI—XVI of FIG. 15.

Similarly, one end of the link 227 is pivotally attached at 243 to the lever 225, and the other end of the link is attached at 245 to the shutter 229 which, in turn, is pivotally mounted at 247 on the panel 173. As shown in FIGS. 13 and 15, the panel 177 includes an elongated access opening 249 through which the crank rod 65 is inserted for the purpose of charging the spring 77 in the manner described above. When the circuit interrupter 7 is either completely withdrawn or completely inserted into the enclosure 5, the lever 221 is in the position shown in FIGS. 15 and 16 (for example in the completely inserted position) such as out of contact with the trip rail 231 and the shutter 229 is held out of alignment with the opening 249. As shown in FIGS. 14 and 16 the ends of the trip rail 231 are tapered at 251 so that during insertion or withdrawal of the circuit interrupter in the enclosure, the pin 233 is free to move over the rail without obstruction.

Accordingly, the interlock system of this device satisfies problems of a prior existing type by providing complete safety and correct operational sequence for the removal or withdrawal of the circuit interrupter. The interlock system prevents an operator from either inadvertently or otherwise attempting to insert or withdraw a circuit interrupter into or from an enclosure when the interrupter is in an unsafe condition.

What is claimed is:

1. Enclosed switchgear comprising an enclosure including a rear wall, a bottom wall, and a front opening, enclosure terminal means supported on said rear wall, a circuit interrupter removably mounted within said enclosure and comprising interrupter terminal means for cooperating connection with said enclosure terminal means, said interrupter being movable between connected and disconnected positions of said enclosure terminal means with said corresponding interrupter terminal means, said interrupter having a stationary contact structure electrically connected to said corresponding terminal means, said interrupter also having a movable contact structure connected to said corresponding terminal means and movable relative to said stationary contact structure between open and closed positions therewith, said interrupter having drive means including a rotatable operating shaft and a connecting link which link is operatively connected between said operating shaft and said movable contact structure, means for moving said circuit interrupter between said connected and disconnected positions and comprising a rotatable rod having screw means for moving said interrupter into and out of said enclosure, said rotatable rod also having opening means in its surface linkage means extending between said rotatable operating shaft and said rotatable rod and comprising a lever movable into and out of said opening means when said operating shaft is rotated respectively between closed and open positions of said contact structures and when the opening means is aligned with the lever.

2. The enclosed switchgear of claim 1 wherein said rotatable rod is a rotatable screw in which the opening means comprises a keyway, said lever comprising a key and a rod between the keyway and said operating shaft operative to move said key into and out of said keyway when said shaft is rotated.

3. The enclosed switchgear of claim 2 wherein said key is biased into said keyway and said rod being operable to move said key out of said keyway when said shaft is in the open position.

4. The enclosed switchgear of claim 3 wherein said drive means comprises an overcenter spring structure operatively connected to said operating shaft, a spring-charging element rotatably mounted on said shaft and operable between first and second positions to move said overcenter spring structure from the spring-discharged position to the spring-charged position, and key means operatively connected with said spring-charging element for locking and unlocking said shaft when said spring-charging element is rotated respectively between said spring-charged and said spring-discharged positions.

5. The enclosed switchgear of claim 4 in which said key means comprises second linkage means extending between said spring-charging element and said key means for holding said key means in said unlocked position when said element is in said spring-discharged position.

6. The enclosed switchgear of claim 4 in which means are provided for preventing rotation of said spring-charging element and comprising a shutter movable between access blocking and unblocking positions with respect to said element, a trip rail within said enclosure and disposed in a direction parallel to movement of said circuit interrupter between connected and disconnected positions, said rail having a terminal end spaced from said rear wall, and lever means extending between said shutter and said rail for maintaining said shutter in said blocking position when said lever means is on said rail and in said unblocking position when said lever means is at said terminal end of said rail.

7. Enclosed switchgear comprising an enclosure including a rear wall, a bottom wall, and a front opening, enclosure terminal means supported on said rear wall, a circuit interrupter removably mounted within said enclosure and comprising interrupter terminal means for cooperating connection with said enclosure terminal means, said interrupter being movable between connected and disconnected positions of said enclosure terminal means with corresponding interrupter terminal means, said interrupter having a stationary contact structure electrically connected to said corresponding terminal means, sad interrupter also having a movable contact structure connected to said corresponding terminal means and movable relative to said stationary contact structure between open and closed positions therewith, said interrupter having drive means including a rotatable operating shaft and a connecting link which link is operatively connected between said operating shaft and said movable contact structure, means for moving said circuit interrupter between said connected and disconnected positions and comprising a rotatable rod having screw means for moving said interrupter into and out of said enclosure, said rotatable rod also having opening means in its surface, said drive means comprising an overcenter spring structure operatively connected to said operating shaft, a spring-charging element rotatably mounted on said shaft and operable between first and second positions to move said overcenter spring structure from said spring-discharged position to said spring-charged position, blocking means for preventing rotation of said spring-charging element and comprising a shutter movable between access blocking and unblocking positions with respect to said element, a trip rail within said enclosure and disposed in a direction parallel to movement of said circuit interrupter between connected and disconnected positions, said rail having a terminal end spaced from said rear wall, and a levering mechanism extending between said shutter and said rail and being operative to maintain said shutter in said blocking position when said mechanism is on the rail and in said unblocking position when said mechanism is at said terminal end of said rail.

8. The enclosed switchgear of claim 7 in which said trip rail is disposed on said bottom wall, a panel coextensive with said front opening of said enclosure and provided with an access aperture adjacent to said spring-charging element, said shutter being pivotally mounted on said panel for movement between positions blocking and unblocking said access aperture, said levering mechanism operatively connected between said shutter and said trip rail operable to move said shutter to said blocking position when said circuit interrupter is in said connected position of said enclosure terminal means and to said unblocking position when said circuit interrupter is in said unconnected position, whereby access to said spring-charging element is available when said shutter is in said unblocking position.

9. The enclosed switchgear of claim 8 in which end portions of said trip rail are inclined downwardly from top surface of said trip rail to said bottom wall of said enclosure, and said lever mechanism comprises a lever having one end positioned to move along said trip rail when said circuit interrupter is moved in between said connected and disconnected positions, and said other end of said lever being connected to said shutter for moving said shutter to said unblocked position when said one end of said lever is on said rail top surface.

* * * * *